US012649470B2

(12) United States Patent
Yoshida et al.

(10) Patent No.: US 12,649,470 B2
(45) Date of Patent: Jun. 9, 2026

(54) DRIVING ASSISTANCE SYSTEM, DRIVING ASSISTANCE DEVICE, DRIVING ASSISTANCE METHOD, AND STORAGE MEDIUM STORING DRIVING ASSISTANCE PROGRAM

(71) Applicants: DENSO CORPORATION, Kariya-city (JP); TOYOTA JIDOSHA KABUSHIKI KAISHA, Toyota (JP)

(72) Inventors: Sho Yoshida, Tokyo (JP); Tomohito Terazawa, Tokyo (JP); Yuta Ikezawa, Susono (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 18/905,771

(22) Filed: Oct. 3, 2024

(65) Prior Publication Data

US 2025/0026345 A1     Jan. 23, 2025

Related U.S. Application Data

(63) Continuation of application No. PCT/JP2023/012969, filed on Mar. 29, 2023.

(30) Foreign Application Priority Data

Apr. 5, 2022     (JP) ................................. 2022-063129

(51) Int. Cl.
*B60W 30/18* (2012.01)
*B60W 30/14* (2006.01)
(Continued)

(52) U.S. Cl.
CPC .... *B60W 30/18154* (2013.01); *B60W 30/143* (2013.01); *B60W 50/082* (2013.01); (Continued)

(58) Field of Classification Search
CPC ........ B60K 28/00; B60K 28/02; B60K 28/04; B60K 28/06; B60K 28/063; B60K 28/066; (Continued)

(56) References Cited

U.S. PATENT DOCUMENTS

2017/0080930 A1     3/2017   Morimoto et al.
2019/0064843 A1     2/2019   Matsui et al.
(Continued)

FOREIGN PATENT DOCUMENTS

JP     2010-64613 A     3/2010
JP     2021-96700 A     6/2021

*Primary Examiner* — Mark L. Greene
(74) *Attorney, Agent, or Firm* — Precision Patents, P.C.

(57)     ABSTRACT

A driving assistance system includes a processor configured to cause the system to execute deceleration control according to a distance from a vehicle to a specific area which is switchable between a crossing allowable state and a crossing prohibited state, obtain state information for the specific area, obtain a crossing instruction of a vehicle user that instructs the vehicle to cross the specific area, stop the deceleration control in response to the obtaining of the crossing instruction when the state information indicates the crossing allowable state, prohibit the deceleration control from stopping until the obtaining of the crossing instruction even during the crossing allowable state, and stop the deceleration control before the obtaining of the crossing instruction when a reliability of the state information falling within an acceptable range, even during the crossing allowable state.

9 Claims, 7 Drawing Sheets

(51) Int. Cl.
    *B60W 50/08*       (2020.01)
    *B60W 50/14*       (2020.01)

(52) U.S. Cl.
    CPC ....... *B60W 50/14* (2013.01); *B60W 2554/802*
               (2020.02); *B60W 2556/10* (2020.02)

(58) Field of Classification Search
    CPC ........ B60K 28/08; B60K 28/10; B60K 28/12;
             B60K 28/14; B60K 28/16; B60K 28/165;
             B60K 2028/003; B60K 2028/006; B60W
                30/12; B60W 30/143; B60W 30/16;
                B60W 30/162; B60W 30/165; B60W
            30/17; B60W 30/18154; B60W 30/18159;
               B60W 30/182; B60W 50/082; B60W
            50/14; B60W 2050/143; B60W 2050/146;
              B60W 2554/00; B60W 2554/80; B60W
            2554/802; B60W 2556/10; G05D 1/0061;
               G05D 1/0088; G05D 1/021; G05D
             1/0214; G05D 1/0221; G05D 1/0223
    See application file for complete search history.

(56)                References Cited

U.S. PATENT DOCUMENTS

| | | | |
|---|---|---|---|
| 2019/0359227 A1* | 11/2019 | Otaki .................. | G06V 20/584 |
| 2020/0218280 A1 | 7/2020 | Matsui et al. | |
| 2022/0121218 A1 | 4/2022 | Matsui et al. | |

\* cited by examiner

DRIVING ASSISTANCE SYSTEM, DRIVING ASSISTANCE DEVICE, DRIVING ASSISTANCE METHOD, AND STORAGE MEDIUM STORING DRIVING ASSISTANCE PROGRAM

CROSS REFERENCE TO RELATED APPLICATIONS

The present application is a continuation application of International Patent Application No. PCT/JP2023/012969 filed on Mar. 29, 2023, which designated the U.S. and claims the benefit of priority from Japanese Patent Application No. 2022-063129 filed on Apr. 5, 2022. The entire disclosures of all of the above applications are incorporated herein by reference.

TECHNICAL FIELD

The present disclosure relates to a driving assistance technology for controlling driving assistance in a host vehicle.

BACKGROUND

A driving assistance device is known which assists deceleration of a vehicle in response to a traffic light.

SUMMARY

According to a first aspect of the present disclosure, a driving assistance system configured to control driving assistance for a host vehicle is provided. The driving assistance system includes a processor configured to cause the driving assistance system to carry out executing deceleration control that decelerates the host vehicle according to a distance from the host vehicle to a specific area which is switchable between a crossing allowable state and a crossing prohibited state. The crossing allowable state is a state where crossing the specific area is allowed, and the crossing prohibited state is a state where the crossing the specific area is prohibited. The processor is further configured to cause the driving assistance system to carry out obtaining state information regarding a state for the specific area, obtaining a crossing instruction of a user of the host vehicle that instructs the host vehicle to cross the specific area, stopping the deceleration control in response to the obtaining of the crossing instruction based on the state information indicating the crossing allowable state, prohibiting the stopping of the deceleration control until the obtaining of the crossing instruction based on the state information indicating the crossing allowable state, and stopping the deceleration control before the obtaining of the crossing instruction based on the state information indicating the crossing allowable state and a reliability of the state information falling within an acceptable range.

According to a second aspect of the present disclosure, a driving assistance device configured to be mounted in a host vehicle to control driving assistance for the host vehicle is provided. The driving assistance device includes a processor configured to cause the driving assistance device to carry out executing deceleration control that decelerates the host vehicle according to a distance from the host vehicle to a specific area which is switchable between a crossing allowable state and a crossing prohibited state. The crossing allowable state is a state where crossing the specific area is allowed and the crossing prohibited state is a state where the crossing the specific area is prohibited. The processor is further configured to cause the driving assistance device to carry out obtaining state information regarding a state for the specific area, obtaining a crossing instruction of a user of the host vehicle that instructs the host vehicle to cross the specific area, stopping the deceleration control in response to the obtaining of the crossing instruction based on the state information indicating the crossing allowable state, prohibiting the stopping of the deceleration control until the obtaining of the crossing instruction based on the state information indicating the crossing allowable state, and stopping the deceleration control before the obtaining of the crossing instruction based on the state information indicating the crossing allowable state and a reliability of the state information falling within an acceptable range.

According to a third aspect of the present disclosure, a driving assistance method executed by a processor for controlling driving assistance for a host vehicle is provided. The driving assistance method includes executing deceleration control that decelerates the host vehicle according to a distance from the host vehicle to a specific area which is switchable between a crossing allowable state, where crossing the specific area is allowed, and a crossing prohibited state, where the crossing the specific area is prohibited, obtaining state information regarding a state for the specific area, obtaining a crossing instruction of a user of the host vehicle that instructs the host vehicle to cross the specific area, stopping the deceleration control in response to the obtaining of the crossing instruction based on the state information indicating the crossing allowable state, prohibiting the stopping of the deceleration control until the obtaining of the crossing instruction based on the state information indicating the crossing allowable state, and stopping the deceleration control before the obtaining of the crossing instruction based on the state information indicating the crossing allowable state and a reliability of the state information falling within an acceptable range.

According to a fourth aspect of the present disclosure, a non-transitory storage medium storing a driving assistance program is provided. The driving assistance program is configured to, when executed by a processor, cause the processor to carry out executing deceleration control that decelerates the host vehicle according to a distance from the host vehicle to a specific area which is switchable between a crossing allowable state, where crossing the specific area is allowed, and a crossing prohibited state, where the crossing the specific area is prohibited, obtaining state information regarding a state for the specific area, obtaining a crossing instruction of a user of the host vehicle that instructs the host vehicle to cross the specific area, stopping the deceleration control in response to the obtaining of the crossing instruction based on the state information indicating the crossing allowable state, prohibiting the stopping of the deceleration control until the obtaining of the crossing instruction based on the state information indicating the crossing allowable state, and stopping the deceleration control before the obtaining of the crossing instruction based on the state information indicating the crossing allowable state and a reliability of the state information falling within an acceptable range.

DETAILED DESCRIPTION OF THE PREFERRED EMBODIMENTS

Figure 1:
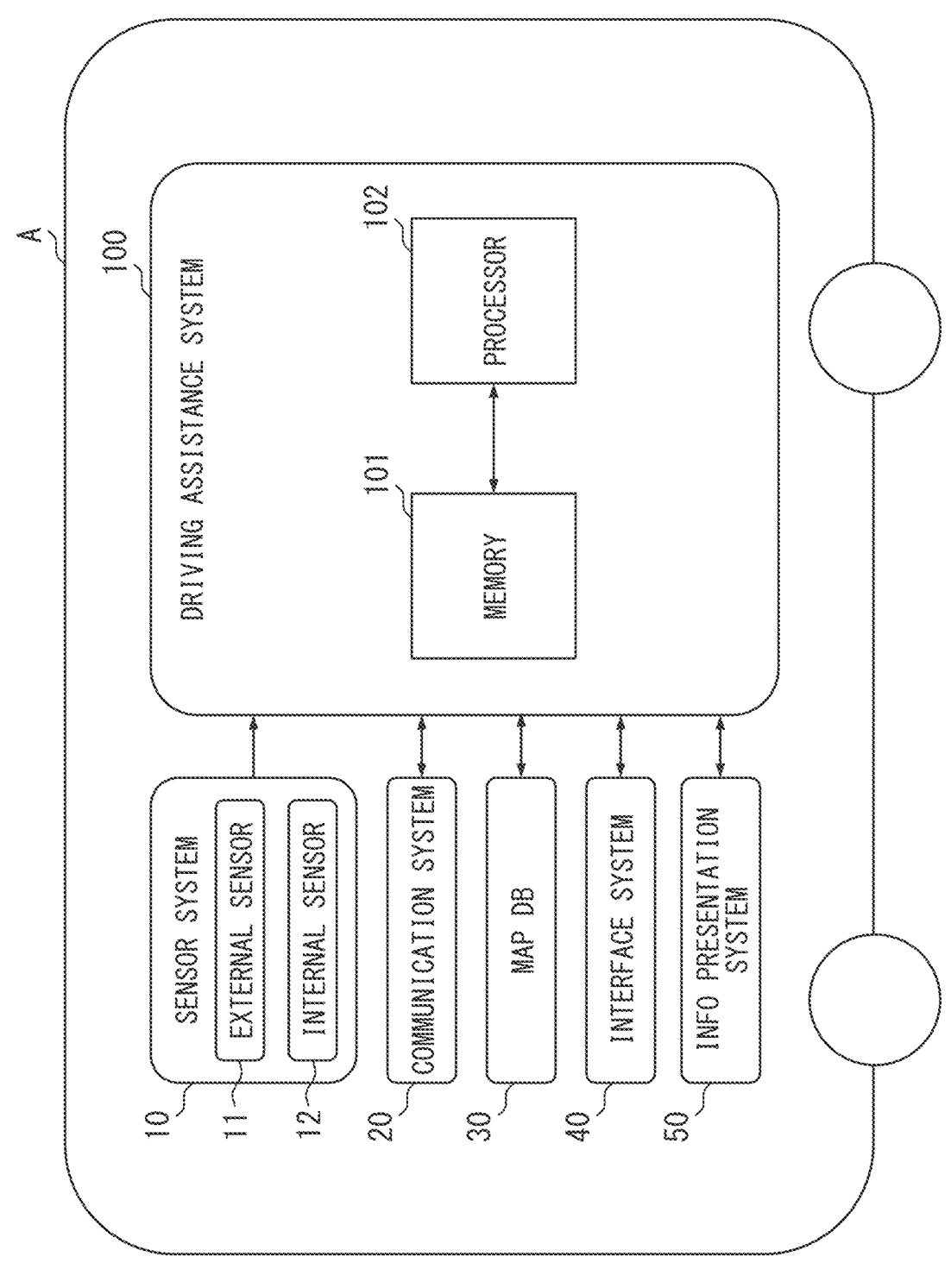
FIG. 1 is a block diagram illustrating an overall configuration according to a first embodiment.

To begin with, examples of relevant techniques will be described.

A driving assistance device has known which assists deceleration of a vehicle in response to a traffic light. This driving assistance device determines whether the traffic light has switched to a crossing allowable state while executing the deceleration assistance for the traffic light. When the driving assistance device determines that the traffic light is in the crossing allowable state, the driving assistance device temporarily continues the deceleration assistance for a preset period, and stops the deceleration control when the preset period has elapsed.

The driving assistance device described above may stop the deceleration assistance after a lapse of the preset period even when the driving assistance device has erroneously recognized that the traffic light in a crossing prohibited state as indicating the crossing allowable state. This may cause the vehicle to accelerate again toward the traffic light that indicates the crossing prohibited state.

It is an objective of the present disclosure to provide a driving assistance system that can avoid inappropriate re-acceleration. It is another objective of the present disclosure to provide a driving assistance device that can avoid inappropriate re-acceleration. It is another objective of the present disclosure to provide a driving assistance method that can avoid inappropriate re-acceleration. It is yet another objective of the present disclosure to provide a storage medium storing a driving assistance program that can avoid inappropriate re-acceleration.

Hereinafter, a technical solution of the present disclosure to address the above-described objectives will be described.

According to a first aspect of the present disclosure, a driving assistance system configured to control driving assistance for a host vehicle is provided. The driving assistance system includes a processor configured to cause the driving assistance system to carry out executing deceleration control that decelerates the host vehicle according to a distance from the host vehicle to a specific area which is switchable between a crossing allowable state and a crossing prohibited state. The crossing allowable state is a state where crossing the specific area is allowed, and the crossing prohibited state is a state where the crossing the specific area is prohibited. The processor is further configured to cause the driving assistance system to carry out obtaining state information regarding a state for the specific area, obtaining a crossing instruction of a user of the host vehicle that instructs the host vehicle to cross the specific area, stopping the deceleration control in response to the obtaining of the crossing instruction based on the state information indicating the crossing allowable state, prohibiting the stopping of the deceleration control until the obtaining of the crossing instruction based on the state information indicating the crossing allowable state, and stopping the deceleration control before the obtaining of the crossing instruction based on the state information indicating the crossing allowable state and a reliability of the state information falling within an acceptable range.

According to a second aspect of the present disclosure, a driving assistance device configured to be mounted in a host vehicle to control driving assistance for the host vehicle is provided. The driving assistance device includes a processor configured to cause the driving assistance device to carry out executing deceleration control that decelerates the host vehicle according to a distance from the host vehicle to a specific area which is switchable between a crossing allowable state and a crossing prohibited state. The crossing allowable state is a state where crossing the specific area is allowed and the crossing prohibited state is a state where the crossing the specific area is prohibited. The processor is further configured to cause the driving assistance device to carry out obtaining state information regarding a state for the specific area, obtaining a crossing instruction of a user of the host vehicle that instructs the host vehicle to cross the specific area, stopping the deceleration control in response to the obtaining of the crossing instruction based on the state information indicating the crossing allowable state, prohibiting the stopping of the deceleration control until the obtaining of the crossing instruction based on the state information indicating the crossing allowable state, and stopping the deceleration control before the obtaining of the crossing instruction based on the state information indicating the crossing allowable state and a reliability of the state information falling within an acceptable range.

According to a third aspect of the present disclosure, a driving assistance method executed by a processor for controlling driving assistance for a host vehicle is provided. The driving assistance method includes executing deceleration control that decelerates the host vehicle according to a distance from the host vehicle to a specific area which is switchable between a crossing allowable state, where crossing the specific area is allowed, and a crossing prohibited state, where the crossing the specific area is prohibited, obtaining state information regarding a state for the specific area, obtaining a crossing instruction of a user of the host vehicle that instructs the host vehicle to cross the specific area, stopping the deceleration control in response to the obtaining of the crossing instruction based on the state information indicating the crossing allowable state, prohibiting the stopping of the deceleration control until the obtaining of the crossing instruction based on the state information indicating the crossing allowable state, and stopping the deceleration control before the obtaining of the crossing instruction based on the state information indicating the crossing allowable state and a reliability of the state information falling within an acceptable range.

According to a fourth aspect of the present disclosure, a non-transitory storage medium storing a driving assistance program is provided. The driving assistance program is configured to, when executed by a processor, cause the processor to carry out executing deceleration control that decelerates the host vehicle according to a distance from the host vehicle to a specific area which is switchable between a crossing allowable state, where crossing the specific area is allowed, and a crossing prohibited state, where the crossing the specific area is prohibited, obtaining state information regarding a state for the specific area, obtaining a crossing instruction of a user of the host vehicle that instructs the host vehicle to cross the specific area, stopping the deceleration control in response to the obtaining of the crossing instruction based on the state information indicating the crossing allowable state, prohibiting the stopping of the deceleration control until the obtaining of the crossing instruction based on the state information indicating the crossing allowable state, and stopping the deceleration control before the obtaining of the crossing instruction based on the state information indicating the crossing allowable state and a reliability of the state information falling within an acceptable range.

According to these first to fourth aspects, the deceleration control is prohibited from stopping until the obtaining of the crossing instruction of the user to cross the specific area even when the obtained state information indicates the crossing allowable state. Thus, it is possible to allow the user to decide whether to stop the deceleration control to cross the specific area. Therefore, inappropriate re-acceleration caused by driving assistance control can be avoided.

Hereinafter, an embodiment of the present disclosure will be described with reference to the drawings.

FIRST EMBODIMENT

A driving assistance system 100 according to the first embodiment shown in FIG. 1 controls driving assistance of a host vehicle A. From a viewpoint from the host vehicle A, the host vehicle A may be also defined as an own vehicle (i.e., an ego-vehicle). The host vehicle A is a mobile body such as an automobile that can travel on a traveling path with an occupant on board.

The host vehicle A can execute an autonomous driving mode, which is classified into levels according to the degree of manual operation by the occupant in a dynamic driving task. The autonomous driving mode may be achieved with an automated driving control, such as conditional driving automation, advanced driving automation, or full driving automation, where the system in operation performs all dynamic driving tasks. The autonomous driving mode may be achieved with an advanced driving assistance control, such as driving assistance or partial driving automation, where an occupant performs partial or all of the dynamic driving tasks. The autonomous driving mode may be realized by either one or combination of the automated driving control and the advanced driving assistance control or switching between the automated driving control and the advanced driving assistance control.

Figure 2:
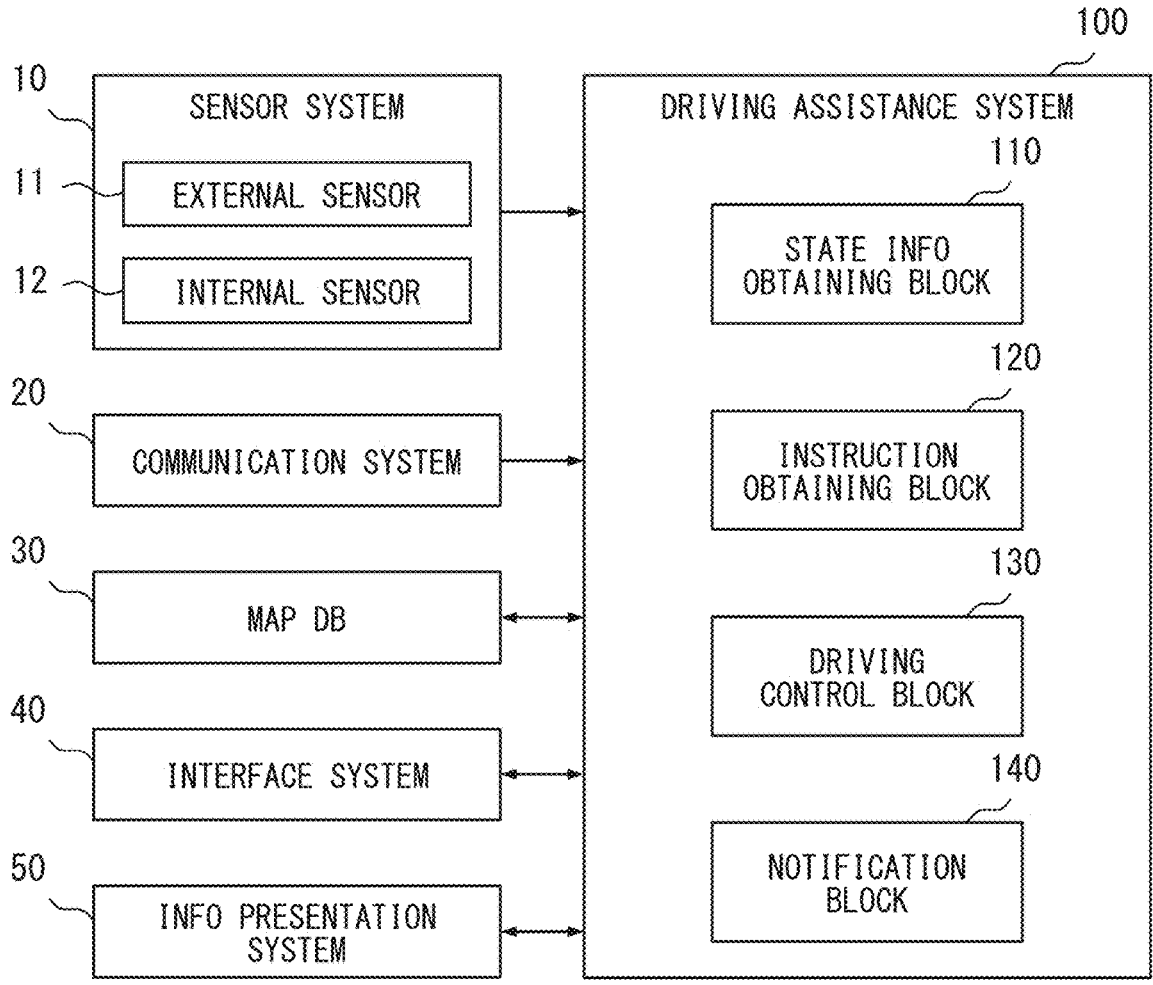
FIG. 2 is a block diagram illustrating a functional configuration of a driving assistance system according to the first embodiment.

The host vehicle A is equipped with a sensor system 10, a communication system 20, a map database (hereinafter referred to as "DB") 30, an interface system 40, and an information presentation system 50 as shown in FIG. 2. The sensor system 10 obtains sensor information available for the driving assistance system 100 from the external environment and the internal environment of the host vehicle A. For this purpose, the sensor system 10 includes an external sensor 11 and an internal sensor 12.

The external sensor 11 obtains external environment information that can be used by the driving assistance system 100 from the external environment, which is the surrounding environment of the host vehicle A. The external sensor 11 may obtain the external environment information by detecting an object existing in the external environment of the host vehicle A. Such object-detecting type external sensor 11 may be at least one of a camera, a Light Detection and Ranging/Laser Imaging Detection and Ranging (i.e., LiDAR), a radar, and a sonar.

The internal sensor 12 obtains, as internal environment information, sensor information from the internal environment of the host vehicle A. The internal sensor 12 may be a physical quantity-detecting type sensor for detecting a specific physical quantity of motion in the internal environment of the host vehicle A. Such physical quantity-detecting type internal sensor 12 may be at least one of a driving speed sensor, an acceleration sensor, and a gyro sensor.

The communication system 20 obtains communication information available for the driving assistance system 100 via wireless communication. The communication system 20 may be a positioning system that receives a positioning signal from an artificial satellite of a global navigation satellite system (i.e., GNSS) located in the external environment of the host vehicle A. The positioning system used as the communication system 20 may be a GNSS receiver. The communication system 20 may be V2X type communication system that exchanges communication signals with a Vehicle to Everything (i.e., V2X) system located in the external environment of the host vehicle A. The V2X type communication system 20 may be at least one of a dedicated short range communications (i.e., DSRC) device and a cellular V2X (i.e., C-V2X) communication device. The communication system 20 may be a terminal-type communication system that exchanges communication signals with a terminal existing in the internal environment of the host vehicle A. The terminal-type communication system 20 may be at least one of Bluetooth (registered trademark) equipment, Wi-Fi (registered trademark) equipment, and infrared communication equipment.

The map DB 30 stores map information available for the driving assistance system 100. The map DB 30 includes at least one type of non-transitory tangible storage mediums, such as a semiconductor memory, a magnetic medium, an optical medium, and the like. The map DB 30 may be a database of a locator for estimating the state quantity of the host vehicle A including the position of the host vehicle A. The map DB 30 may be a database of a navigation unit that navigates the travel route of the host vehicle A. The map DB 30 may be a combination of such databases.

The map DB 30 stores map information available for the driving assistance system 100. The map DB 30 includes at least one type of non-transitory tangible storage mediums, such as a semiconductor memory, a magnetic medium, and an optical medium. The map DB 30 may be a database of a locator for estimating the state quantity of the host vehicle A including the position of the host vehicle A. The map DB 30 may be a database of a navigation unit that navigates the travel route of the host vehicle A. The map DB 30 may be a combination of such databases.

For example, the map DB 30 obtains and stores the latest map information through communication with an external center via the V2X type communication system 20. The map information is a two or three-dimensional data indicating a traveling environment of the host vehicle A. The three-dimensional map data may preferably be digital data of a high-definition map. The map information may include road information indicating at least one of a position, a shape, and a surface condition of a road. The map information may include marking information indicating at least one of a traffic sign, a lane mark position and a lane mark shape associated with a road. The map information may include structure information indicating at least one of positions and shapes of a building and a traffic light along a road.

The map information may include position information regarding a specific area where the state is switched between a crossing allowable state where crossing the specific area is allowed and the crossing the specific area is prohibited. Here, the crossing allowable state and the crossing prohibited state may be mechanically switched by a device that defines the crossing allowable state and the crossing prohibited state. Such devices may be traffic lights, and railroad crossing gates. The crossing allowable state and the crossing prohibited state may be naturally switched depending on the presence of a moving object (e.g., pedestrian, and another vehicle) that prevents the host vehicle A from crossing the specific area. Such specific areas include intersections, crosswalks, and railroad crossings.

The interface system 40 receives instructions of the occupant. The interface system 40 may be an accelerator pedal, a brake pedal, or a steering wheel that receives operations by the occupant. The interface system 40 may be installed in an in-vehicle device such as an on/off switch and a touch panel. For example, the interface system 40 installed in the in-vehicle device is a resume switch for an Adaptive Cruise Control (i.e., ACC) function, which will be described later. The interface system 40 may be a non-contact operation device that recognizes operations such as the voice and gestures of the occupant in a non-contact manner.

The information presentation system 50 presents notification information to the occupant in the host vehicle A. The information presentation system 50 may stimulate the vision sense of the occupant for presenting information. The information presentation system 50 that stimulates the vision sense may be at least one type of a head-up display (i.e., HUD), a multi function display (i.e., MFD), a combination meter, a navigation unit, and a light emitting unit. The information presentation system 50 may stimulate the auditory sense of the occupant for presenting information. The information presentation system 50 that stimulates the auditory sense may be at least one of a speaker, a buzzer, and a vibration unit. The information presentation system 50 may stimulate the skin sense of the occupant for presenting information. The skin sense stimulated by the information presentation system 50 may include at least one of tactile sensation, thermal sensation, and wind sensation. The information presentation system 50 that stimulates the skin sensation may be at least one of a steering wheel vibration unit, a vibration unit for a driver seat, a steering wheel reaction force unit, an accelerator pedal reaction force unit, a brake pedal reaction force unit, and an air conditioning unit.

The driving assistance system 100 is connected to the sensor system 10, the communication system 20, the map DB 30, the interface system 40, and the information presentation system 50 via at least one of a Local Area Network (LAN), a wire harness, an internal bus, and a wireless communication. The driving assistance system 100 is configured by at least one dedicated computer.

The dedicated computer that configures the driving assistance system 100 may be a drive control Electronic Control Unit (ECU) that controls the driving operation of the host vehicle A. The dedicated computer that configures the driving assistance system 100 may be a navigation ECU that navigates a travel route of the host vehicle A. The dedicated computer that configures the driving assistance system 100 may be a locator ECU that estimates the self-state quantity of the host vehicle A. The dedicated computer that configures the driving assistance system 100 may be an actuator ECU that controls driving actuators of the host vehicle A. The dedicated computer that configures the driving assistance system 100 may be a Human Machine Interface Control Unit (HCU) that controls information presentation by the information presentation system 50 in the host vehicle A. The dedicated computer that configures the driving assistance system 100 may be a computer outside the host vehicle A that configures an external center or a mobile terminal that can communicate with the host vehicle A via the V2X type communication system 20.

The dedicated computer that configures the driving assistance system 100 may be an integrated Electronic Control Unit (ECU) that integrally controls the driving of the host vehicle A. The dedicated computer that configures the driving assistance system 100 may be a determination ECU that determines driving tasks in the driving control of the host vehicle A. The dedicated computer that configures the driving assistance system 100 may be a monitoring ECU that monitors the driving control of the host vehicle A. The dedicated computer that configures the driving assistance system 100 may be an evaluation ECU that evaluates the driving control of the host vehicle A.

The dedicated computer constituting the driving assistance system 100 includes at least one memory 101 and at least one processor 102. The memory 101 is at least one type of non-transitory tangible storage medium, which stores computer readable programs and data in non-transitory manner, such as a semiconductor memory, a magnetic medium, and an optical medium. Here, the memory 101 may accumulate and retain data even when the host vehicle A is turned off, or may temporarily store data by deleting the data when the host vehicle A is turned off. The processor 102 includes, as a processing core, at least one type of a Central Processing Unit (CPU), a Graphics Processing Unit (GPU), a Reduced Instruction Set Computer (RISC)-CPU, a Data Flow Processor (DFP), and a Graph Streaming Processor (GSP).

The processor 102 in the driving assistance system 100 executes multiple instructions in the driving assistance program stored in the memory 101 to assist the driving of the host vehicle A. Accordingly, the driving assistance system 1 constructs multiple functional blocks for controlling the driving assistance of the host vehicle A. The functional blocks constructed in the driving assistance system 100 include a state information obtaining block 110, instruction obtaining block 120, a driving control block 130, and a notification block 140.

The state information obtaining block 110 is configured to obtain state information relating to a state for the specific area. The state information is information whether the specific area is in the crossing allowable state or the crossing prohibited state. The state information obtaining block 110 obtains, for example, state information included in the external environment information. Specifically, when the specific area is an intersection with traffic lights, the state information is recognition results of the light state of the traffic lights. When the specific area is a railroad crossing, the status information is recognition results of the status of the railroad crossing gates and the alarm device in the railroad crossing. When the specific area is a crosswalk, the state information is recognition results of a pedestrian crossing the crosswalk. The state information obtaining block 110 determines whether the specific area is in the crossing allowable state by obtaining such state information.

The instruction obtaining block 120 obtains, from the interface system 40, a crossing instruction of the driver to instruct the host vehicle A to cross the specific area during deceleration control, which will be described later. For example, the crossing instruction may be performed by depression of the accelerator pedal in the host vehicle A. Alternatively, the crossing instruction may be performed by an operation of the resume switch for ACC control. Alternatively, the crossing instruction may be performed by a non-contact operation such as a voice operation or a gesture operation of the driver. The instruction obtaining block 120 determines whether the crossing instruction is present by detecting such crossing instructions.

The driving control block 130 executes driving control of the host vehicle A executing driving assistance. The driving control block 130 executes, as the driving assistance, various types of driving control according to situations. The driving control executed by the driving control block 130 includes at least ACC control, safety control, deceleration control, and stop control. The ACC control is a cruising control that controls the driving speed of the host vehicle A and the following distance between the host vehicle A and the preceding vehicle. More specifically, during the ACC control, the driving control block 130 causes the host vehicle A to travel at a constant set speed if there is no preceding vehicle. The driving control block 130 causes the host vehicle A to follow the preceding vehicle while maintaining a set following distance if there is a preceding vehicle. The above-described ACC control is started based on an operation to start the ACC control by the driver.

The safety control is driving control for avoiding risks while driving. The safety control includes pre-collision safety (PCS) control and automatic emergency braking (AEB) control. The driving control block 130 stores an execution history of such safety control in a storage medium such as the memory 101.

The deceleration control is a control that is executed when a predetermined condition is met during the ACC control. The deceleration control is executed after the ACC control is stopped. The deceleration control is control for decelerating the host vehicle A according to a distance from the host vehicle A to the specific area. The driving control block 130 determines whether to execute the deceleration control depending on the execution history of the above-mentioned safety control. Specifically, the driving control block 130 executes the deceleration control if there is an execution history of the safety control within a specified period, such as a period from the activation of the host vehicle A, and avoids executing the deceleration control if there is no execution history within that period.

The deceleration control includes a first deceleration control and a second deceleration control. The first deceleration control is executed prior to the second deceleration control. The driving control block 130 determines whether a first deceleration condition is met, and starts the first deceleration control when the first deceleration condition is met. The first deceleration condition is met when the distance from the host vehicle A to the specific area is within a first deceleration segment. The driving control block 130 may determine whether the first deceleration condition is met based on the position information of the specific area included in the map information and the current position of the host vehicle A. The driving control block 130 starts the first deceleration control at a stage where it is impossible to determine whether the state for the specific area is the crossing allowable state or the crossing prohibited state.

The driving control block 130 executes the second deceleration control when determining that a second deceleration condition is met during the first deceleration control. The second deceleration condition is met when the state information of the specific area is obtained as the crossing prohibited state. The second deceleration condition may additionally include that the distance from the host vehicle A to the specific area is within a second deceleration segment that is closer to the specific area than the first deceleration segment is.

The driving control block 130 may change control manner between the first deceleration control and the second deceleration control. For example, the driving control block 130 may decelerate the host vehicle A more gently in the first deceleration control than in the second deceleration control.

The driving control block 130 stops the above-mentioned deceleration control depending on the situation, and resumes the ACC control. Specifically, the driving control block 130 stops the deceleration control when the obtained state information indicates the crossing allowable state and the crossing instruction is obtained during the deceleration control. Contrary, the driving control block 130 prohibits the deceleration control from stopping until the crossing instruction is obtained.

However, during the first deceleration control, the driving control block 130 allows the deceleration control to stop before the crossing instruction is obtained if the state information indicates the crossing allowable state and a vehicle condition, which will be described later, is met. That is, during the second deceleration control, the driving control block 130 determines whether to stop the deceleration control depending on the presence of the crossing instruction in the crossing allowable state.

In addition, the driving control block 130 allows the deceleration control to stop during the second deceleration control even before the crossing instruction is obtained, if the obtained state information indicates the crossing allowable state and a vehicle condition, which will be described later, is met.

Here, the vehicle condition is met when the reliability of the state information is within an acceptable range and no malfunction is detected in the external sensor 11 that is used to obtain the state information. The reliability of the state information is the accuracy of the determination as to whether the specific area is in the crossing allowable state or the crossing prohibited state. The reliability is estimated based on, for example, the state of the data used to obtain the state information, or a comparison between statistical information in state classification and the current state information. The acceptable range here is a range in which the reliability exceeds a threshold or is equal to or greater than the threshold. A malfunction of the external sensor 11 is detected based on a predetermined malfunction diagnosis process, such as a process of detecting the presence of an abnormality in the detection result of the external sensor 11, for example.

The driving control block 130 allows the deceleration control to stop in response to obtaining of the crossing instruction, even if the obtained state information indicates the crossing prohibited state.

The driving control block 130 executes the stop control for stopping the host vehicle A when a stop condition is met during the deceleration control. The stop condition is met when the speed of the host vehicle A is below or equal to a threshold value and the distance between the current position of the host vehicle A and the specific area is within a stopping segment that is closer to the specific area than the second deceleration segment is. During the stop control, the driving control block 130 may keep the host vehicle A stopped until an instruction of the driver to instruct the host vehicle A to start traveling is obtained.

The notification block 140 notifies the user of the crossing prohibited state in response to obtaining of the crossing instruction of the user despite the obtained state information indicating the crossing prohibited state. The notification block 140 may issue the notification when the above-mentioned condition is satisfied during the second deceleration control. The notification block 140 may notify the user that the specific area is prohibited from crossing through by stimulating at least one of the visual, auditory, and skin senses.

Figure 3:
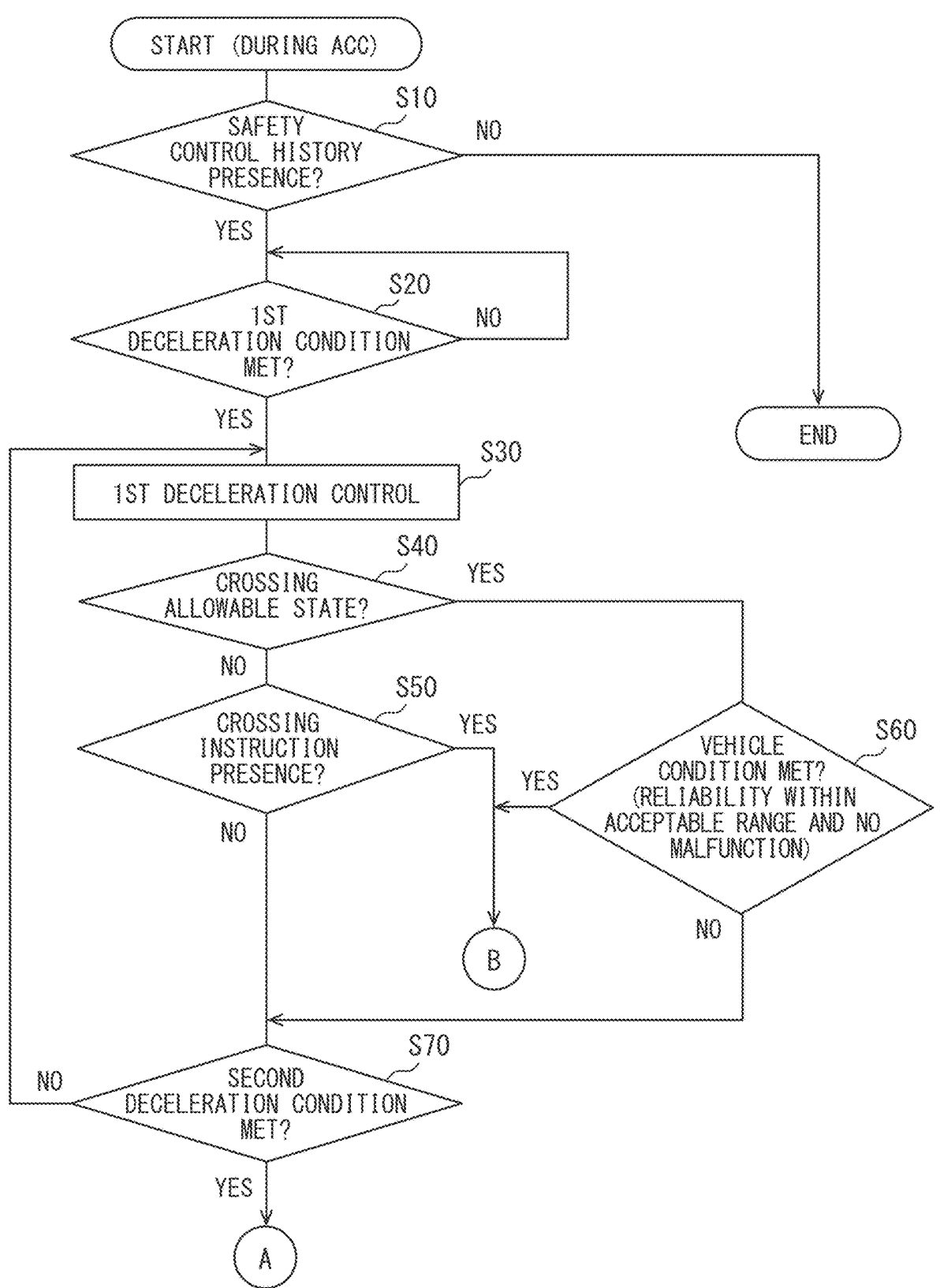
FIG. 3 is a flowchart showing a driving assistance flow according to the first embodiment.
Figure 4:
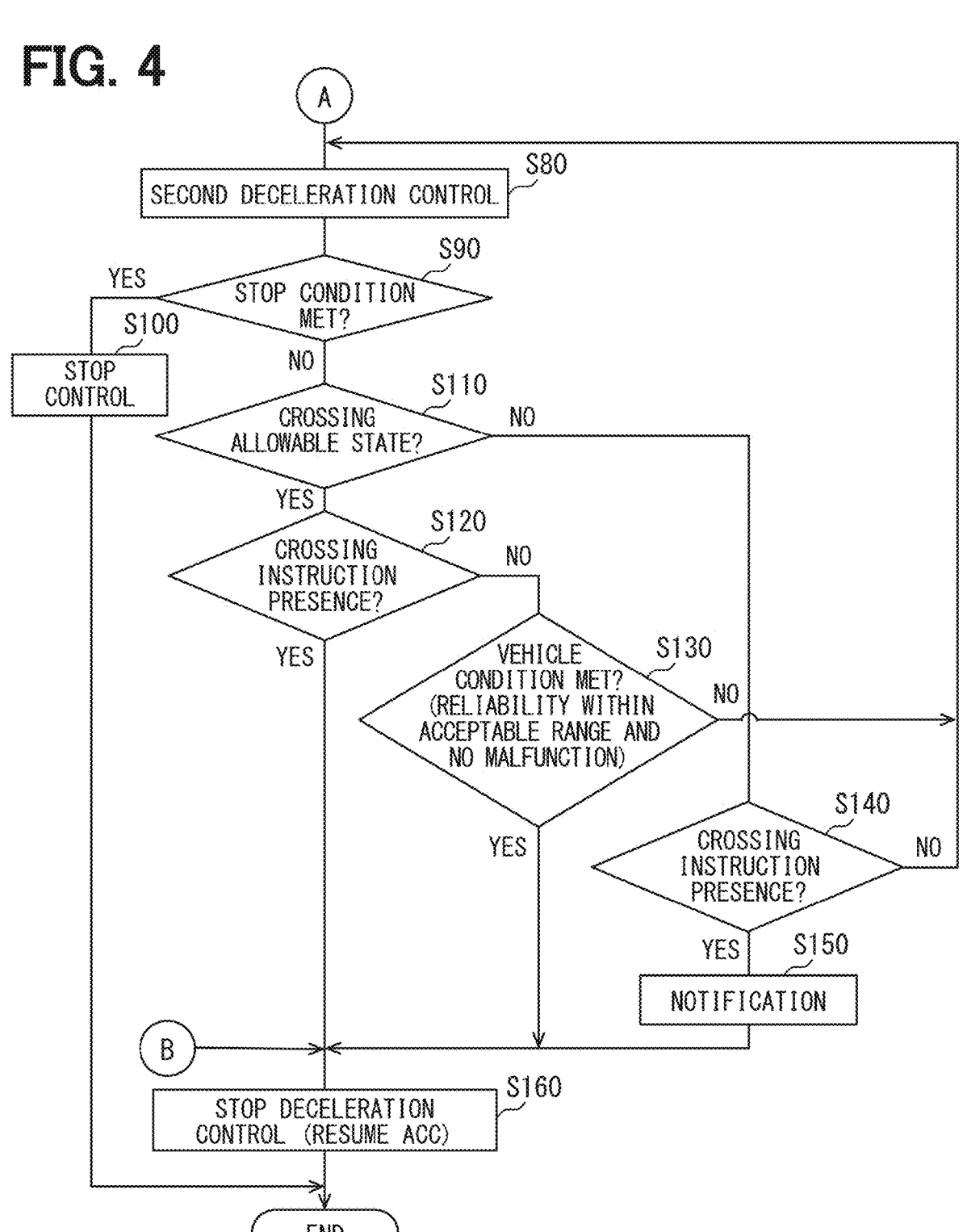
FIG. 4 is a flowchart showing subsequent processes of the driving assistance flow in FIG. 3.

FIGS. 3 and 4 below show a flow of the driving assistance method that the driving assistance system 100 assists driving of the host vehicle A with cooperation of the functional blocks 110, 120, 130, and 140. This driving assistance flow is repeatedly executed during the ACC control of the host vehicle A. Each "S" in this processing flow means a step executed by instructions included in the driving assistance program.

First, in S10 of FIG. 3, the driving control block 130 determines whether an execution history of the safety control is present within a predetermined period. When the driving control block 130 determines that there is no execution history, this flow ends. In other words, when the driving safety of the driver is relatively high, the deceleration control described below is not executed, and the driver operates the host vehicle A to cross the specific area during the ACC control. Note that this driving assistance flow may skip S10 and proceed to S20 regardless of whether the execution history is present.

In the next step S20, the driving control block 130 determines whether the first deceleration condition for executing the first deceleration control is met. If the first deceleration condition is not met, the processing waits until the first deceleration condition is met.

When the driving control block 130 determines that the first deceleration condition is met, the flow proceeds to S30. In S30, the driving control block 130 executes the first deceleration control. During the first deceleration control, the driving control block 130 decelerates the host vehicle A according to the distance from the host vehicle A to the specific area.

In S40 after the start of the first deceleration control, the state information obtaining block 110 determines whether the obtained state information indicates the crossing allowable state. When the state information obtaining block 110 determines that the obtained state information has not indicated the crossing allowable state, the flow proceeds to S50. In S50, the instruction obtaining block 120 determines whether a crossing instruction has been obtained. When the instruction obtaining block 120 determines that the crossing instruction has not been obtained, the flow proceeds to S70. Contrary, the instruction obtaining block 120 determines that the crossing instruction has been obtained, the flow proceeds to S160.

When the state information obtaining block 110 determines that the state information indicates the crossing allowable state in S40, the flow proceeds to S60. In S60, the driving control block 130 determines whether the vehicle condition is met. When the driving control block 130 determines that the vehicle condition has not been met, the flow proceeds to 70. Contrary, when the driving control block 130 determines that the vehicle condition is met, the flow proceeds to S160 in FIG. 4.

In S70, the driving control block 130 determines whether the second deceleration condition is met. If the driving control block 130 determines that the second deceleration condition has not been met, the flow returns to S30, and the first deceleration control is continued.

Contrary, when the driving control block determines in S70 that the second deceleration condition is met, the flow proceeds to S80 in FIG. 4. In S80, the driving control block 130 executes the second deceleration control. The driving control block 130 adjusts the deceleration rate of the host vehicle A so that the host vehicle A can stop at a stop point defined before the specific area, for example.

In the next step S90, the driving control block 130 determines whether the stop condition is met. When the driving control block 130 determines that the stop condition has been met, the flow proceeds to S100. In S100, the driving control block 130 executes the stop control. This flow ends when the host vehicle A is stopped by execution of the stop control. The host vehicle A may be restarted by the occupant's operation to instruct the host vehicle A to start.

Contrary, when the stop condition has not been met in S90, the flow proceeds to S110. In S110, the state information obtaining block 110 determines whether the obtained state information indicates the crossing allowable state for the specific area. When the state information obtaining block 110 determines that the state information indicates the crossing allowable state, the flow proceeds to S120.

In S120, the instruction obtaining block 120 determines whether a crossing instruction has been obtained. If the instruction obtaining block 120 determines that the crossing instruction has been obtained, the flow proceeds to S160, which will be described later. Contrary, when the instruction obtaining block 120 determines that the crossing instruction has not been obtained, the flow proceeds to S130.

In S130, the driving control block 130 determines whether the vehicle condition is met. If the driving control block 130 determines that the vehicle condition has not been met, the flow returns to S80, and the second deceleration control continues. Contrary, if the driving control block 130 determines that the vehicle condition has been met, the flow proceeds to S160, which will be described later.

Contrary, if the state information obtaining block 110 determines that the state information has not indicated the crossing allowable state, the flow proceeds to S140. In S140, the instruction obtaining block 120 determines whether a crossing instruction has been obtained. If the instruction obtaining block 120 determines that the crossing instruction has not been obtained, the flow returns to S80, and the second deceleration control continues.

Contrary, when the instruction obtaining block 120 determines that the crossing instruction has been obtained, the flow proceeds to S150. In S150, the notification block 140 notifies the user that the specific area is in the crossing prohibited state. After the notification is executed, the flow proceeds to S160.

In S160, the driving control block 130 ends the deceleration control and executes the return of the ACC control (i.e., resumes the ACC control).

According to the first embodiment described above, the deceleration control is prohibited from stopping until the crossing instruction by the user, which instructs the host vehicle A to cross the specific area, is obtained even when the state information indicates the crossing allowable state for the specific area. Thus, the user has a responsibility to decide whether to stop the deceleration control to cross the specific area. Therefore, inappropriate re-acceleration caused by driving assistance control can be avoided.

Furthermore, according to the first embodiment, the deceleration control is stopped even without the crossing instruction when the reliability of the state information indicating the crossing allowable state falls within an acceptable range and a malfunction of the external sensor 11 for obtaining the state information has not been detected. Therefore, the deceleration control is automatically stopped only when the reliability of the state information is high and the external sensor 11 does not have a malfunction. This eliminates the inconvenience to the user in terms of issuing instructions.

Furthermore, the driving assistance device according to the first embodiment executes the deceleration control when the host vehicle A reaches a position close to the specific area during the ACC control that controls the driving speed and the following distance of the host vehicle A, and restarts the ACC control after stopping the deceleration control. Therefore, it is possible to execute the deceleration control according to the distance to the specific area during the ACC control, and to surely return to the ACC control after the deceleration control is stopped.

In addition, according to the first embodiment, whether to execute the deceleration control is determined depending on the execution history of the safety control for risks during driving. That is, whether to execute the deceleration control is determined depending on the presence of a risk management in the past. Specifically, execution of the deceleration control in the presence of the execution history of the safety control allows a driver who may engage in risky driving to receive benefits of driving assistance.

Furthermore, according to the first embodiment, when the crossing instruction is obtained during the state information indicating the crossing prohibited state, the user is notified of the crossing prohibited state. Thus, it may be possible to alert the user who is about to stop the deceleration control despite the crossing prohibited state.

Furthermore, according to the first embodiment, when the state information indicates the crossing allowable state during the first deceleration control, the crossing instruction is not always necessary to stop the deceleration control. According to this, the deceleration control can be automatically stopped based on the state information indicating the crossing allowable state during the first deceleration control where the distance to the specific area is relatively long. This eliminates the inconvenience to the user in terms of issuing instructions.

Other Embodiments

Although one embodiment has been described, the present disclosure should not be limited to the above embodiment and may be applied to various other embodiments within the scope of the present disclosure.

Figure 5:
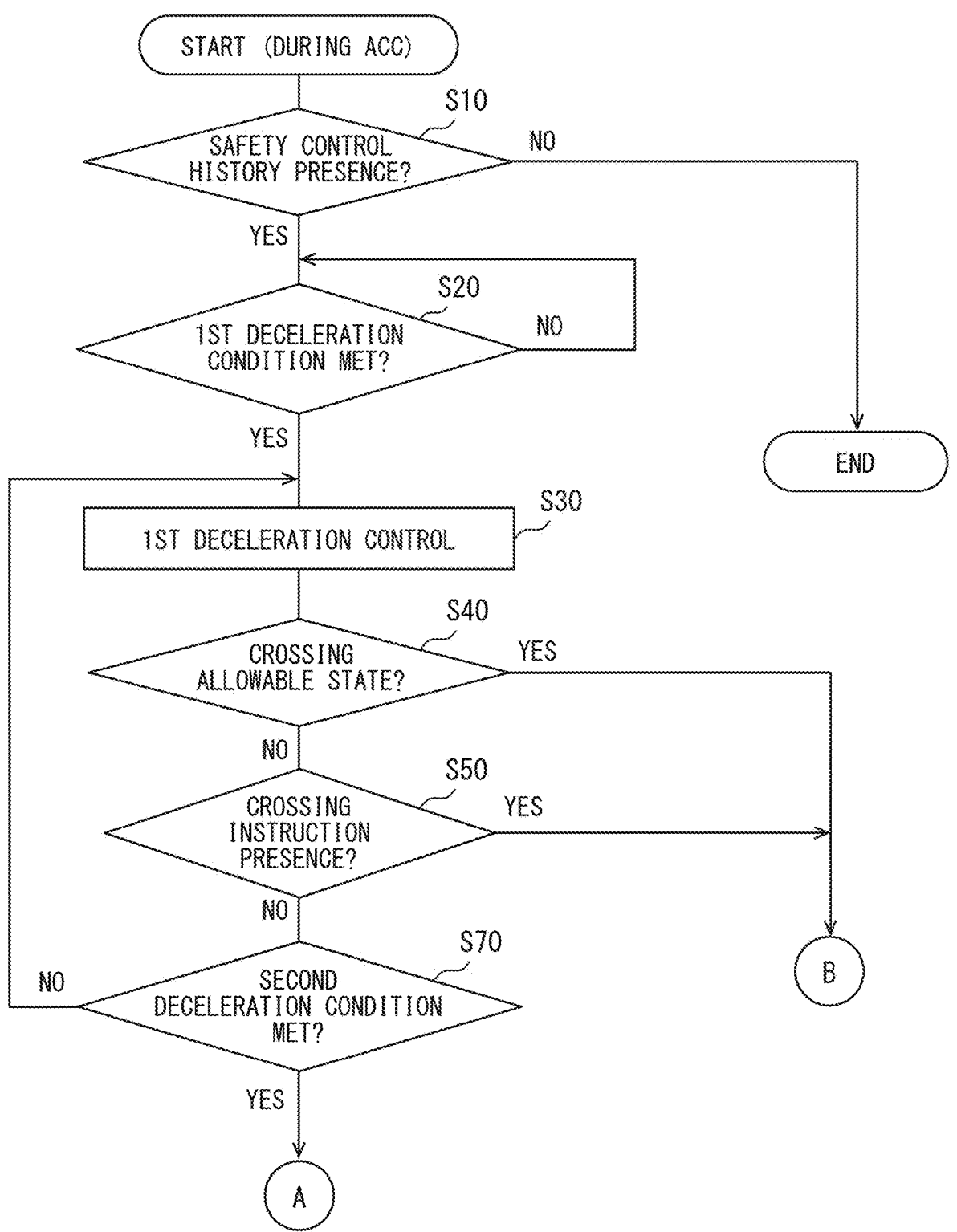
FIG. 5 is a flowchart showing a driving assistance flow according to another embodiment.
Figure 6:
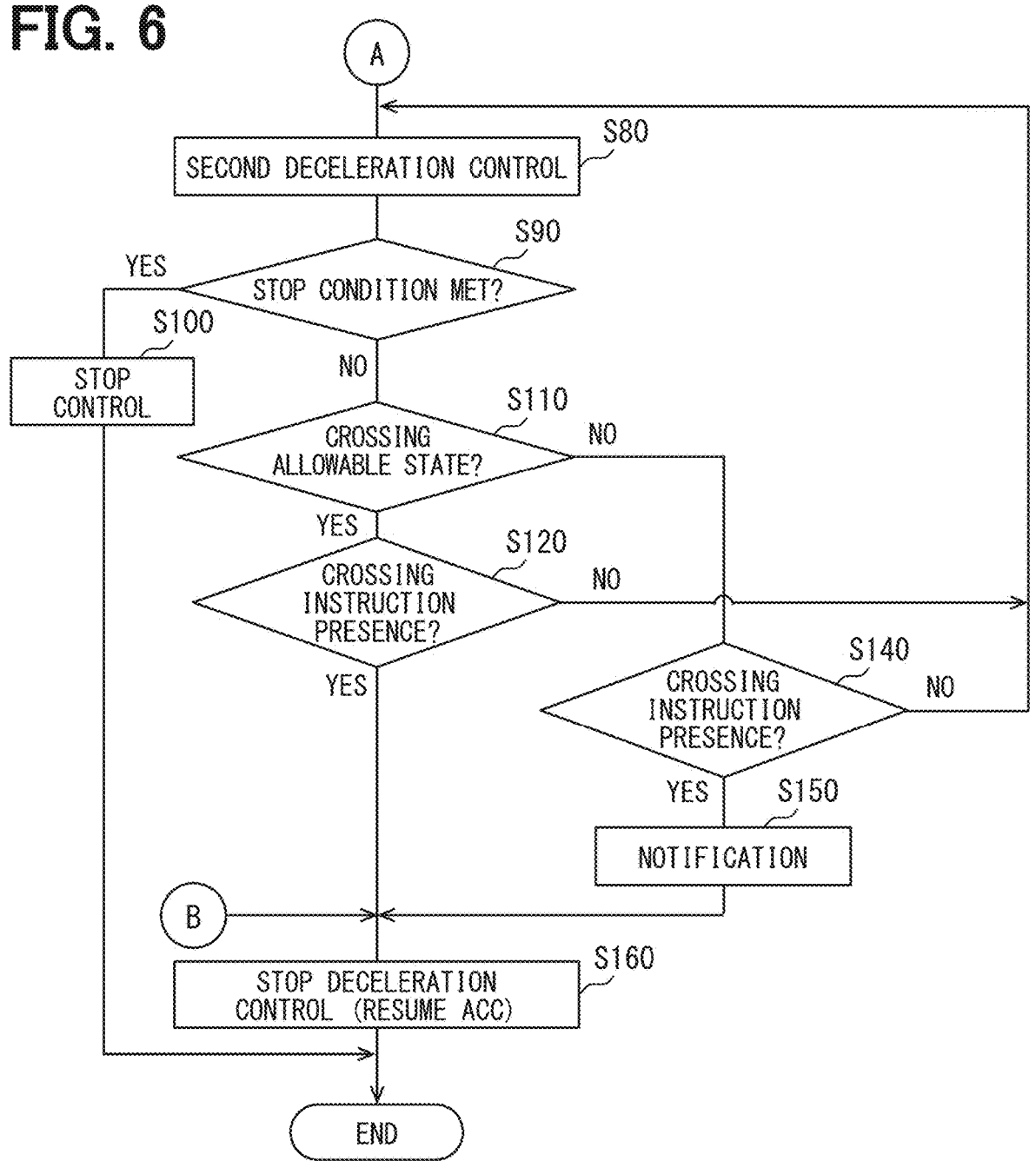
FIG. 6 is a flowchart showing subsequent processes of the driving assistance flow in FIG. 5.

As a modified example, the driving assistance system 100 may omit determination whether the vehicle condition is met. For example, as shown in FIG. 5, when it is determined in S40 that the obtained state information indicates the crossing allowable state, the flow may skip the determination regarding the vehicle condition and proceed to S160 where the deceleration control is stopped. Also, as shown in FIG. 6, when the state information indicates the crossing allowable state and the crossing instruction has not been obtained in S120, the flow may skip the determination regarding the vehicle condition and return to S80, and the deceleration control may be continued.

Figure 7:
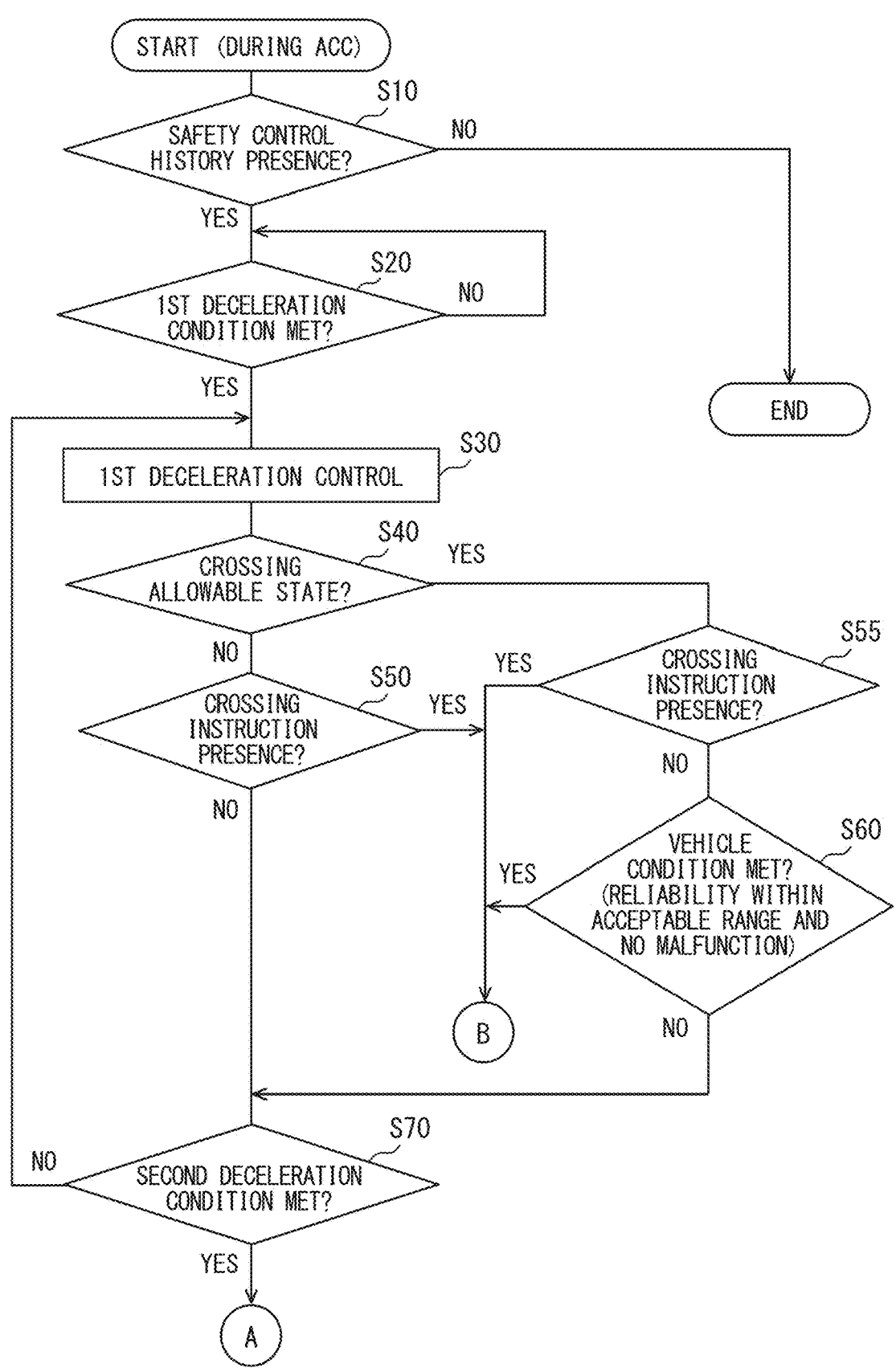
FIG. 7 is a flowchart showing a driving assistance flow according to another embodiment.

As a modified example, the driving assistance system 100 may execute the first deceleration control depending on the crossing instruction while the state information indicates the crossing allowable state. For example, as shown in FIG. 7, when it is determined in S40 that the state information indicates the crossing allowable state, the flow proceeds to S55, then when it is determined in S55 that the crossing instruction is obtained, the flow proceeds to S160. Contrary, when it is determined that the crossing instruction has not been obtained, the flow proceeds to S60. Also in this modified example, the determination as to the vehicle condition (i.e., S60) may be skipped and the flow may proceed directly to S70 when the crossing instruction has not been obtained.

As a modified example, in the driving assistance system 100, the vehicle condition may not include whether the external sensor 11 has a malfunction. That is, the driving assistance system 100 may make a positive determination in S60 when the reliability falls within the acceptable range.

As a modified example, the driving assistance system 100 may determine whether to execute the deceleration control during the ACC control based on a setting made by the user. In other words, the driving assistance system 100 may be configured to execute the deceleration control when the user has set the execution of the deceleration control to ON, and not execute the deceleration control when the user has set the deceleration control to OFF.

As a modified example, the driving assistance system 100 may execute the deceleration control in a situation other than during the ACC control. For example, the driving assistance system 100 may execute the deceleration control during manual driving.

In another modification, a dedicated computer constituting the driving assistance system 100 may include at least one of a digital circuit or an analog circuit, as a processor. In particular, the digital circuit is at least one type of, for example, an Application Specific Integrated Circuit (ASIC), a Field Programmable Gate Array (FPGA), a System on a Chip (SOC), a Programmable Gate Array (PGA), and a Complex Programmable Logic Device (CPLD). Such a digital circuit may also include a memory in which a program is stored.

In addition to the embodiments and modifications described above, the driving assistance device may be implemented as a control device that is configured to be mountable on the host vehicle A and has at least one processor 102 and at least one memory 101. Specifically, the above-described embodiment and modified examples may be implemented in the form of a processing circuit (e.g., a processing ECU) or a semiconductor device (e.g., a semiconductor chip).

The invention claimed is:

1. A driving assistance system configured to control driving assistance for a host vehicle, the driving assistance system comprising a processor configured to cause the driving assistance system to carry out:

executing deceleration control that decelerates the host vehicle according to a distance from the host vehicle to a specific area which is switchable between a crossing allowable state and a crossing prohibited state, wherein the crossing allowable state is a state where crossing the specific area is allowed, and the crossing prohibited state is a state where the crossing the specific area is prohibited;

obtaining state information regarding a state for the specific area;

obtaining a crossing instruction of a user of the host vehicle that instructs the host vehicle to cross the specific area;

stopping the deceleration control in response to the obtaining of the crossing instruction based on the state information indicating the crossing allowable state;

prohibiting the stopping of the deceleration control until the obtaining of the crossing instruction based on the state information indicating the crossing allowable state; and stopping the deceleration control before the obtaining of the crossing instruction based on the state information indicating the crossing allowable state and a reliability of the state information falling within an acceptable range.

2. The driving assistance system according to claim 1, wherein the obtaining of the state information is performed via an external sensor, and the processor is further configured to cause the driving assistance system to carry out prohibiting the stopping of the deceleration control before the obtaining of the crossing instruction based on a malfunction of the external sensor being detected even when the reliability falls within the acceptable range.

3. The driving assistance system according to claim 1, wherein the processor is further configured to cause the driving assistance system to carry out:

executing a cruise control that controls a driving speed of the host vehicle and a following distance between the host vehicle and a preceding vehicle;

switching to the deceleration control from the cruise control according to the distance from the host vehicle to the specific area; and restarting the cruise control after stopping the deceleration control.

4. The driving assistance system according to claim 1, wherein the processor is further configured to cause the driving assistance system to carry out determining whether to execute the deceleration control according to an execution history of safety control for a risk during the host vehicle traveling.

5. The driving assistance system according to claim 1, wherein the processor is further configured to cause the driving assistance system to carry out:

notifying the user of the crossing prohibited state in response to the obtaining of the crossing instruction based on the state information indicating the crossing prohibited state, and stopping the deceleration control in response to the obtaining of the crossing instruction based on the state information indicating the crossing prohibited state.

6. The driving assistance system according to claim 1, wherein the deceleration control includes:

a first deceleration control that is executed when the distance from the host vehicle to the specific area is in a first deceleration segment; and a second deceleration control that is executed when the distance from the host vehicle to the specific area is in a second deceleration segment that is closer to the specific area than the first deceleration segment is, and the processor is further configured to allow the driving assistance system to carry out stopping the deceleration control before the obtaining of the crossing instruction based on the state information indicating the crossing allowable state during the first deceleration control.

7. A driving assistance device configured to be mounted in a host vehicle to control driving assistance for the host vehicle, the driving assistance device comprising a processor configured to cause the driving assistance device to carry out:

executing deceleration control that decelerates the host vehicle according to a distance from the host vehicle to a specific area which is switchable between a crossing allowable state and a crossing prohibited state, wherein the crossing allowable state is a state where crossing the specific area is allowed and the crossing prohibited state is a state where the crossing the specific area is prohibited;

obtaining state information regarding a state for the specific area;

obtaining a crossing instruction of a user of the host vehicle that instructs the host vehicle to cross the specific area;

stopping the deceleration control in response to the obtaining of the crossing instruction based on the state information indicating the crossing allowable state;

prohibiting the stopping of the deceleration control until the obtaining of the crossing instruction based on the state information indicating the crossing allowable state; and stopping the deceleration control before the obtaining of the crossing instruction based on the state information indicating the crossing allowable state and a reliability of the state information falling within an acceptable range.

8. A driving assistance method executed by a processor for controlling driving assistance for a host vehicle, the driving assistance method comprising:

executing deceleration control that decelerates the host vehicle according to a distance from the host vehicle to a specific area which is switchable between a crossing allowable state and a crossing prohibited state, wherein the crossing allowable state is a state where crossing the specific area is allowed and the crossing prohibited state is a state where the crossing the specific area is prohibited;

obtaining state information regarding a state for the specific area;

obtaining a crossing instruction of a user of the host vehicle that instructs the host vehicle to cross the specific area;

stopping the deceleration control in response to the obtaining of the crossing instruction based on the state information indicating the crossing allowable state;

prohibiting the stopping of the deceleration control until the obtaining of the crossing instruction based on the state information indicating the crossing allowable state; and stopping the deceleration control before the obtaining of the crossing instruction based on the state information indicating the crossing allowable state and a reliability of the state information falling within an acceptable range.

9. A non-transitory storage medium storing a driving assistance program for controlling driving assistance for a host vehicle, the driving assistance program being configured to, when executed by a processor, cause the processor to carry out:

executing deceleration control that decelerates the host vehicle according to a distance from the host vehicle to a specific area which is switchable between a crossing allowable state and a crossing prohibited state, wherein the crossing allowable state is a state where crossing the specific area is allowed and the crossing prohibited state is a state where the crossing the specific area is prohibited;

obtaining state information regarding a state for the specific area;

obtaining a crossing instruction of a user of the host vehicle that instructs the host vehicle to cross the specific area;

stopping the deceleration control in response to the obtaining of the crossing instruction based on the state information indicating the crossing allowable state;

prohibiting the stopping of the deceleration control until the obtaining of the crossing instruction based on the state information indicating the crossing allowable state; and stopping the deceleration control before the obtaining of the crossing instruction based on the state information indicating the crossing allowable state and a reliability of the state information falling within an acceptable range.

* * * * *